Dec. 5, 1967  A. O. RADKE ET AL  3,356,413
VEHICLE SEAT
Filed Sept. 10, 1965  4 Sheets-Sheet 1

INVENTORS
ARTHUR O. RADKE
HARVEY N. TENGLER
GARTH O. HALL

John W. Michael
ATTORNEY

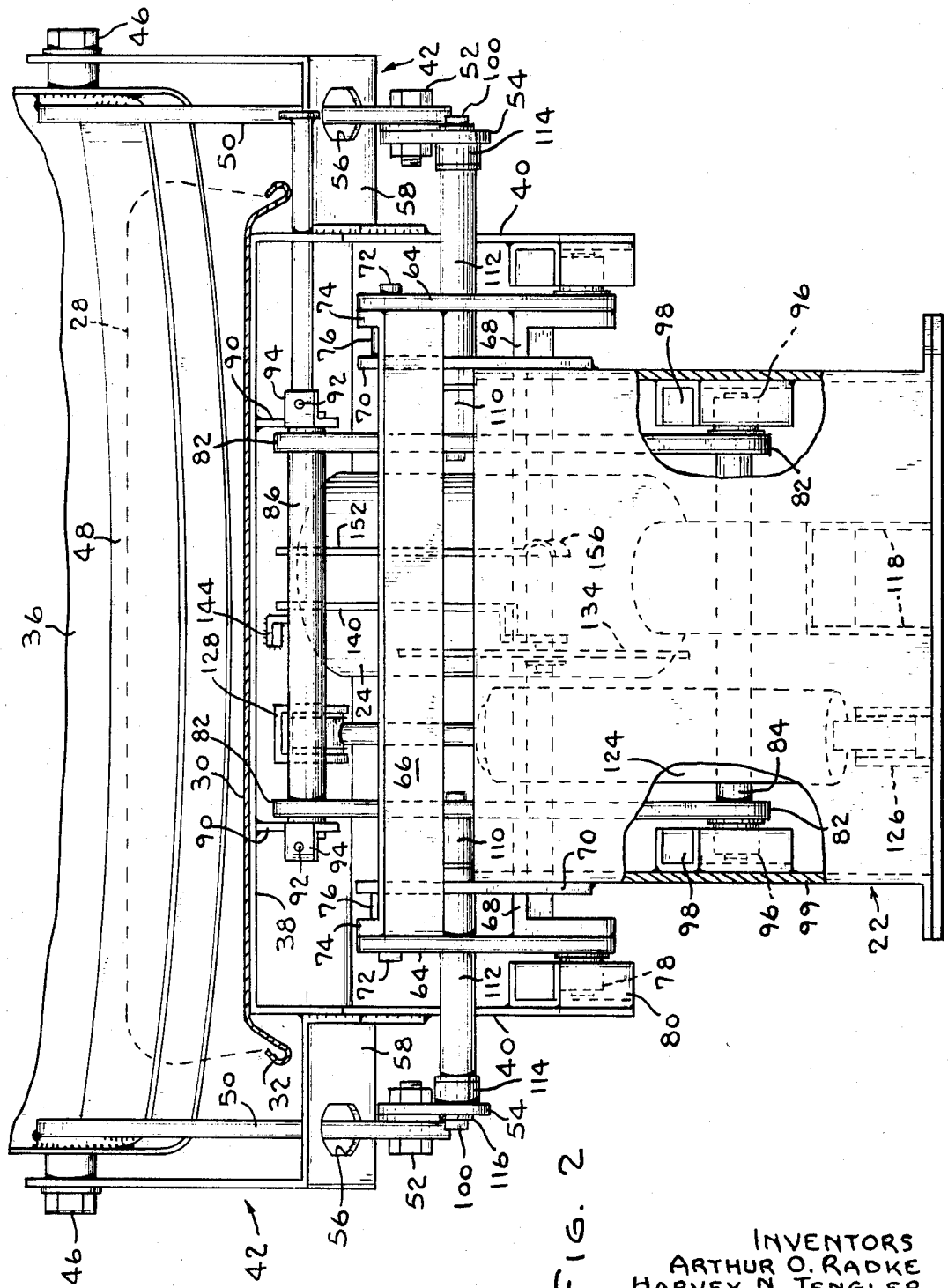

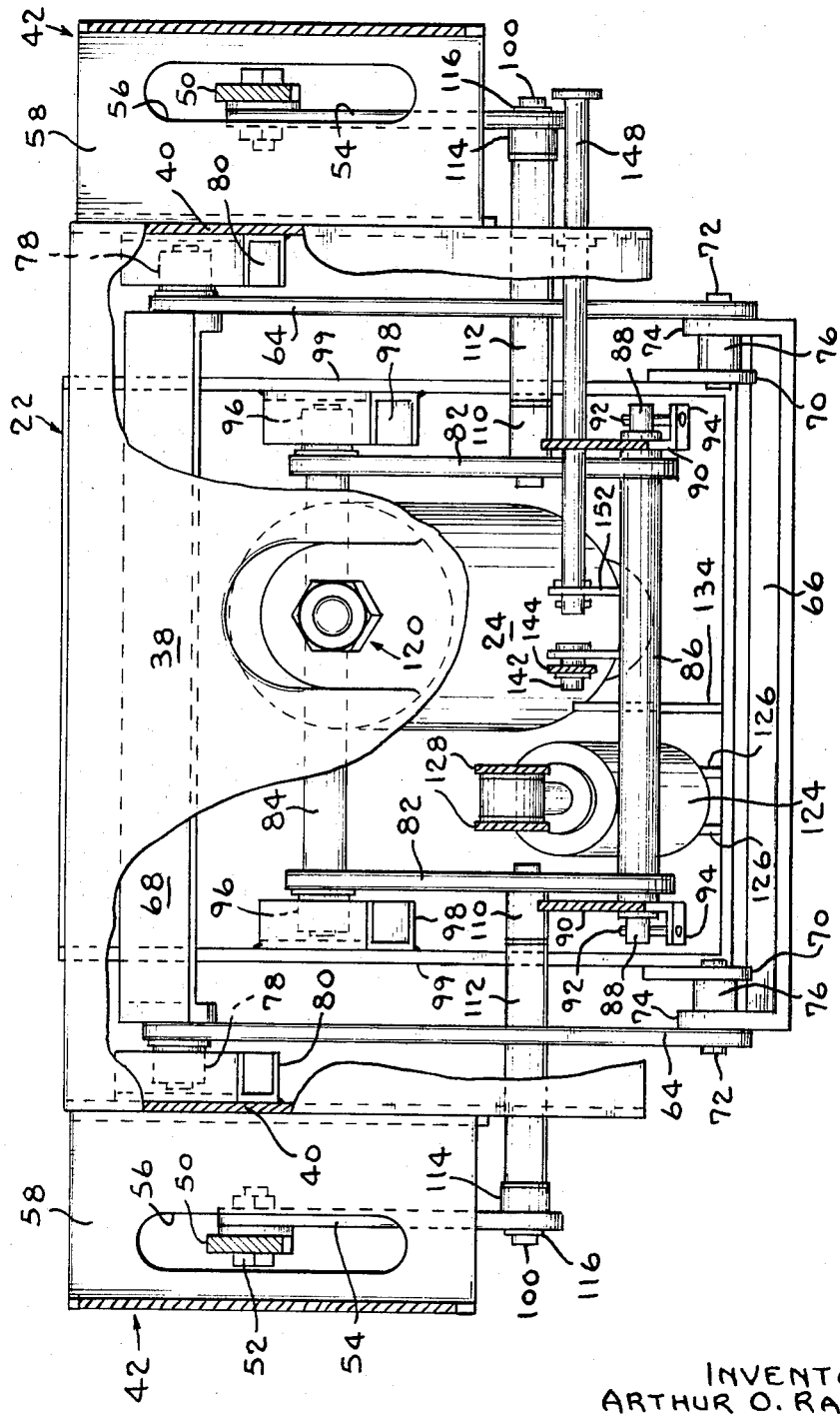

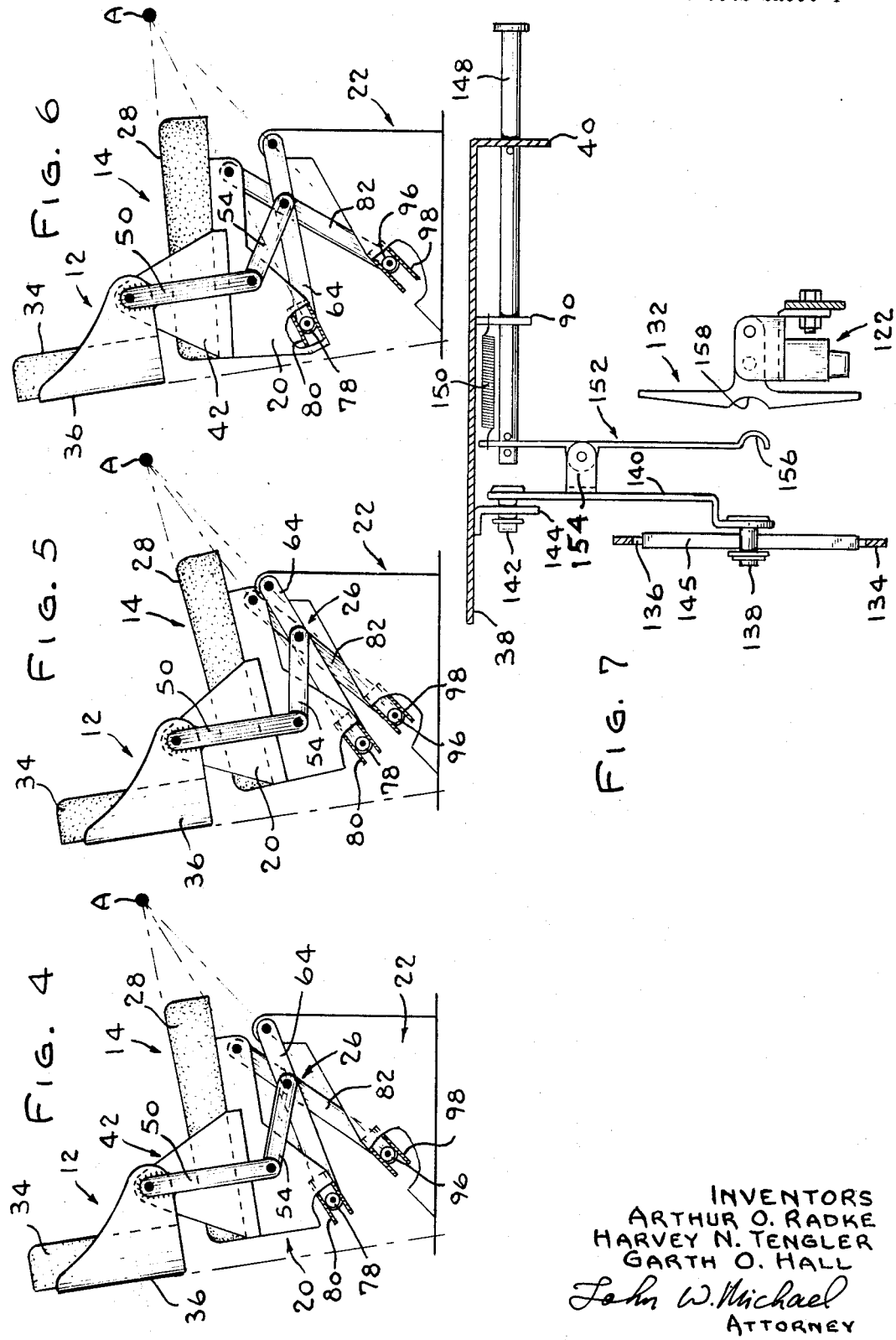

United States Patent Office 3,356,413
Patented Dec. 5, 1967

3,356,413
VEHICLE SEAT
Arthur O. Radke, Shorewood, Harvey N. Tengler, New Berlin, and Garth O. Hall, Brookfield, Wis., assignors to Bostrom Corporation, Milwaukee, Wis., a corporation of Wisconsin
Filed Sept. 10, 1965, Ser. No. 486,310
13 Claims. (Cl. 297—300)

ABSTRACT OF THE DISCLOSURE

The disclosed vehicle seat has a seat and a back member which comprise a seat part which is connected to a base part by an adjustable pneumatic spring and an unsymmetrical scissors linkage, with the linkage being generally inclined upwardly towards the front of the seat to permit the entire seat to move in a line which pivots around the knee point of the occupant during movement of the seat part. The back member is pivotally connected to the seat member at a point intermediate to the back edge of the seat and the fore and aft center line of the seat and is further connected by appropriate linkage to the suspension to maintain the back member at generally the same angular inclination during oscillation of the seat part.

Background of the invention

This invention pertains to improvements in spring biased seats of the type particularly suitable for use with heavy-duty tractors, earth moving equipment and similar machines or vehicles which are usually subjected to considerable vibrations and shock during their use.

The novelty of a seat embodying the present invention resides in the type of movement of the seat's occupant supporting components in respect to the base part when the latter is subjected to vibrations.

In the seat art, this relative movement is usually controlled by a linkage which connects the seat and base parts and limits the relative movement of the seat part to a predetermined path. In some instances, separate linkage or guide members are provided to control the path of the back part.

Prior to this invention the movement of the seat part in respect to the base part has been limited to three types: vertical movement, rectilinear movement, and pivotal movement. Each of these types is illustrated by patents assigned to the Bostrom Corporation, the assignee of the present invention. The vertical movement is attained by the scissors linkage disclosed in Simons et al. 3,109,621. The rectilinear movement is provided by the parallelogram linkage of Simons et al. 2,894,563, and the pivotal movement is illustrated by Radke et al. 3,163,466. The seats disclosed in these patents are very well suited for automotive and tractor applications and are, in fact, commercially successful in these areas. However, as disclosed in detail in this specification, the relative movement between the seat and the base parts can be improved to provide better comfort to the occupant, as well as to further improve his ability to maintain control over the hand and foot controls of the vehicle or machine, particularly for applications in which the vehicle or equipment is subjected to more than the ordinary shock or vibrating conditions.

Summary of Invention

The present improvement is attained by providing a seat in which the entire seat part moves relative to the base part and simultaneously with such movement pivots around a predetermined point. In other words, the entire seat part moves toward and away from the base point, yet the velocity of such movement is different at the front portion of the seat part than at its rear portion, thereby introducing the pivotal component to the entire movement.

This design concept permits a substantial increase in the stroke or the permissible total relative movement between the seat and base parts without affecting the occupant's legs below the knee point and without changing the type of spring biasing provided to the seat part. To accomplish this, the seat is designed so that the rear of the seat part moves substantially faster toward and away from the base part than the front of the seat part, the movements being so coordinated that the occupant pivots around his knee point which is generally positioned about four to ten inches ahead of the front edge of the seat part. The pivotal motion, of course, does not affect the occupant's legs below the knee and, thus, does not interfere with his ability to maintain control over the foot controls of the vehicle. Further, this type of motion permits the total stroke of the seat part at its rear to be in the neighborhood of eight inches whereas, in seats as disclosed in the earlier mentioned patents, the stroke was limited to approximately one-half this distance. In the prior art, seats having a pure vertical or a rectilinear type of motion, an increase in the stroke beyond four inches will usually tend to pull the occupant's feet off the foot controls at the top of the stroke. This is, of course, caused by the upward travel of the front of the seat part. A further practical limitation of such motion is that a greater than four-inch upward travel at the knee point will generally cause interference with the steering wheel and the hand controls of the vehicle. At the bottom of the stroke, the occupant's thighs will be upwardly inclined and, therefore, will not gain full support from the seat part and its cushion. In the seat embodying the present invention, the inclination of the seat part will vary during the stroke to assure full support of this area throughout the entire stroke. In a pivotally mounted seat, the support at the knee area varies, creating pressure when the seat part is below a normal side position and failing to provide full support when above that position. In view of the above, the principal object is to provide a seat in which the seat part moves relative to the base part in such a manner that the comfort of the occupant, as well as his ability to maintain control over the foot controls of the vehicle is improved.

A further important object is to provide a seat having a greater permissible stroke than possible heretofore.

In addition to the features discussed above, the present invention also encompasses the provision of a back part which oscillates with the seat part yet which substantially maintains the same vertical angle despite the pivotal motion of the seat part. This feature is essentially attained by pivotally mounting the back part to the seat part and by providing a lever which is connected for motion with the support linkage of the seat and which causes the back part to pivot in respect to the seat part during oscillation of the seat. This feature is very important in that it prevents any backward pivoting of the occupant as the seat moves downwardly from its normal position. This feature is also important from a design standpoint in that any upstanding base structure required at the rear of the seat, such as was usually required in prior art seats of this type, has been eliminated.

In view of the above, a further object of this invention is to provide a seat support linkage having the above described advantages and in addition thereto providing control over the back part to maintain the same at substantially the same inclination despite the oscillatory motion of the seat part.

Other objects and advantages will be pointed out in, or be apparent from, the specification and claims, as will obvious modifications of the single embodiment shown in the drawings, in which:

FIG. 2 is a fragmentary front view taken on line 2—2 of FIG. 1 with portions being broken away to better illustrate the invention;

FIG. 3 is a top view of the suspension linkage taken on line 3—3 of FIG. 2 with portions being broken away to better illustrate the invention;

FIGS. 4 through 6 are schematic side views of the seat showing the same in the mid, low and high positions respectively and FIG. 7 is a side view of the height adjustment mechanism of the illustrated seat.

Figure 1:
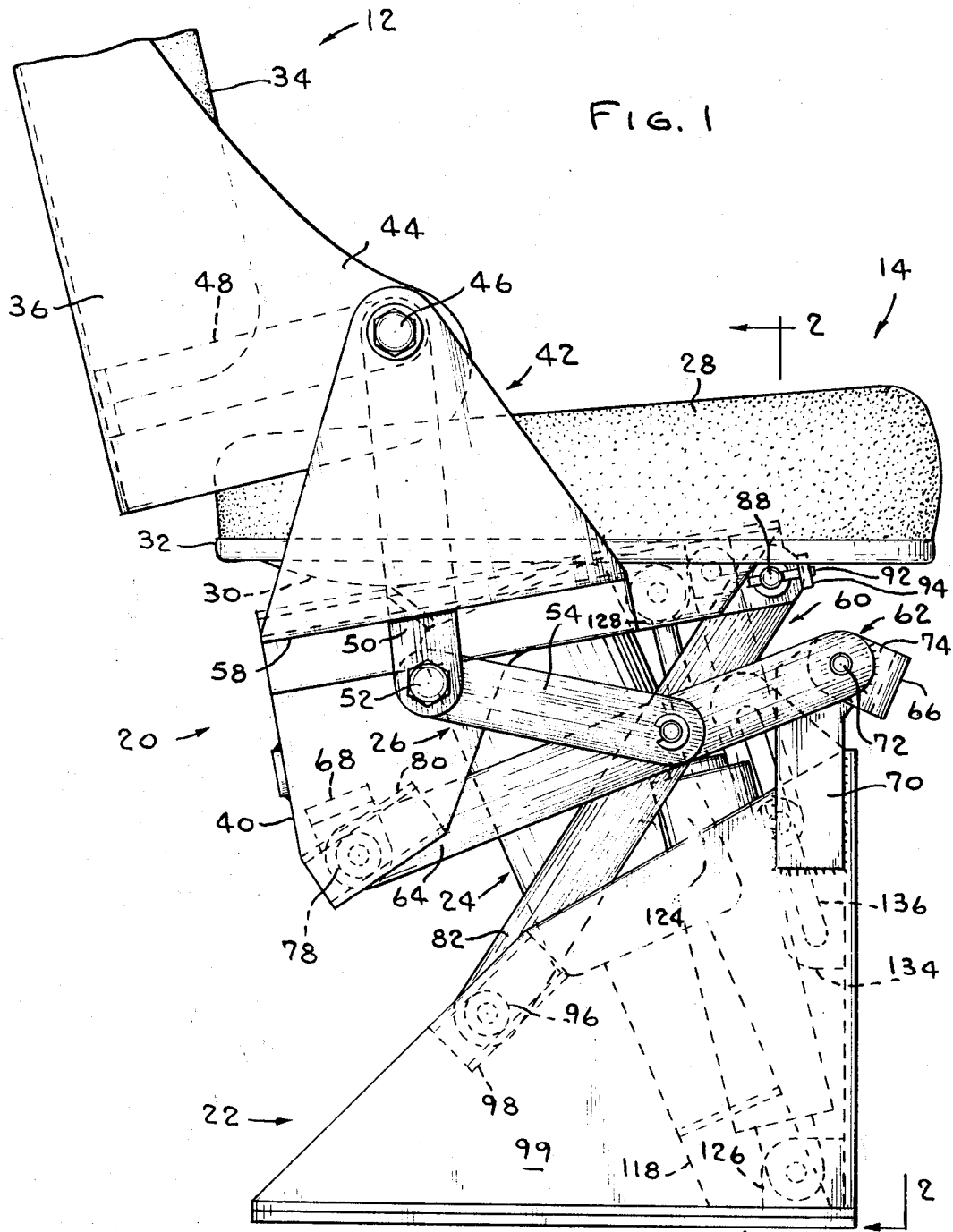
FIG. 1 is a side view of the seat embodying the present invention with the seat being shown at its mid or ride position.

The principles of operation of the preferred embodiment of this invention are best illustrated in FIGS. 4, 5 and 6 which show schematic side views of the simplified seat structure in the mid, low and high positions respectively. The basic elements of the seat structure are a back part 12, a seat part 14, a seat support frame 20, a base frame 22, an air spring 24 biasing the support frame away from the base frame and support linkage 26 which controls the relative motion between the two frames as well as the relative motion between the back and the seat part.

The linkage 26 is comprised of two link members, which are pivotally connected at one of their ends to the seat and base frames respectively, and which are connected at their other ends by a slidable pivot connection to the other of the frames. The link members are pivotally connected at their point of crossover which is located closer to the front end of the seat than the rear. This type of linkage may be classified as a non-symmetrical scissors linkage. This design causes the back of the seat to travel at a greater velocity than the front of the seat during relative movement between the seat and the base frame and, therefore, to provide a vertical as well as pivotal motion to the seat. The practical significance of this type of motion is that the permissible travel of the back of the seat which supports the significantly greater portion of the occupant's weight is sufficient to provide proper vibrational isolation to the occupant, and that the front of the seat travels a substantially smaller distance and, therefore, minimizes the effect of the seats oscillation upon the lower part of the occupant's legs. In the illustrated embodiment the seat part is of a foreshortened depth. Because of this the occupant's knee position would be located a substantial distance ahead of the front edge of the seat part as, for example, at A shown in FIGS. 4-6. In seats of this type the differential is vertical travel between the rear and front of the seat which results in a seat motion which causes the occupant to "pivot" generally around his knee point. Because of this type of motion the occupant is properly isolated from the vibrations of the vehicle or machine yet his legs below the knee point are not disturbed. It should be appreciated that the motion of the occupant is not a true pivotal motion around A and that the point A may not always be at the knee point of the occupant, however, the motion provided for the seat approaches the pivotal motion sufficiently close for all practical purposes to attain the desired result.

The back part 12 is pivotally connected to the seat part 14 and is provided with a pair of dependent lever arms 50, which are connected to the linkage 26, in a manner causing the back part to pivot in respect to the seat part during oscillation of the seat in such a manner as to maintain the back part at substantially the same inclination throughout the oscillation. In absence of this structure the occupant would tend to tip backwardly as the seat part moves towards the base frame which would definitely cause interference with the occupant's ability to maintain proper control over the vehicle.

The seat part 14 is comprised of a resilient cushion 28 of conventional design which is retained in a seat pan 30 by appropriate edging 32. The back part 12 also has a cushion 34 which is fixed to a back pan 36 by conventional means not material to the present invention.

The seat support frame 20 is of a channel shape (FIG. 2) having a web 38 and two dependent flanges 40. The web serves as a support for the seat part 14 which is fixed thereon by conventional means. An upwardly extending bracket 42 is fixed to each flange 40. Each bracket is pivotally connected to the forwardly extending ears 44 of the back pan by suitable bolts 46 which is located about in between the back edge of the seat cushion 28 and the fore and aft center line of the cushion to correspond generally with the hip point of the occupant. A reinforcement band 48 is fixed to the back pan to provide more rigidity thereto. The angular inclination of the back part in respect to the seat part is controlled by lever arms 50, which are fixed at their upper ends to the back pan 36 and which are pivotally connected by bolts 52 and links 54. For this purpose apertures 56 are provided in the outwardly extending portions 58 of the brackets 42. The link 54 is pivotally connected to the support linkage and, as explained hereafter, causes the back part 12 to pivot at bolt 46 during oscillation of the seat to thereby maintain substantially the same angular inclination during the oscillatory motion of the seat.

The support linkage 26 is essentially comprised of two link members 60 and 62 each of which is pivotally connected at one of its ends to either the support or the base frame and slidably connected at the other of its ends to the other of the two frames. The link members are pivotally connected to each other at their point of crossover to thereby form a scissor type linkage. The point of crossover is located closer to the front ends of the links to thereby form a nonsymmetrical scissor type linkage which provides a nonparallel movement of the seat part during actuation of the linkage. When analyzing this structure from a purely mechanical standpoint, the base frame 22 forms the fixed link of a four link linkage and the seat part forms the actuated link thereof.

Each link member is basically of a rectangular rigid frame construction. This shape produces satisfactory rigidity in the transverse as well as in the fore and aft direction.

In particular, link member 62 is comprised of a pair of parallel arms 64 which are rigidly fixed to transverse cross members 66 and 68. The link member 62 is pivotally connected to a pair of upstanding arms 70 of the base frame by pins 72 which extend through the arms 64, the dependent ears 74 of the cross members 66 and the upstanding arms 70 of the base frame. Suitable spacers 76 are provided between the ears. The other end of the link member 62 is provided with a pair of rollers 78 which are in rolling contact with channel shaped rail members 80. The latter are fixed to the flanges 40 of the seat support frame 20. The link member 60 is comprised of two parallel arms 82 which are rigidly fixed to tubular cross-members 84 and 86. At its upper end the link member is pivotally connected to the seat support frame 20 by a shaft 88 which extends through the cross-member 86 and is fixed to the brackets 90 which are in turn fixed to the web 38 of the seat support frame. The shaft 88 is retained against rotation by pins 92 which are received in suitable apertures in the flanges 94 of the brackets. The lower end of this link member is provided with rollers 96, which are in rolling engagement with channel shaped rail members 98, affixed to the sidewalls 99 of the base frame.

The link members are pivotally connected to each other at their point of crossover by pins 100 which extend through bushings 110 and 112. The former is welded to the arms 82 of link member 60 and the latter is welded to the arms 64 of the other cross-member and extends on both sides thereof. At their outer ends the pins 100 are received in small bushings 114 welded to the links 54 and are retained therein by suitable washers 116 to provide a pivotal connection between the links 54 and the support linkage 26.

The air spring 24 is of conventional design and is fixed to the base frame 22 by a bracket 118 and to the web 38 of the seat support frame 20 by bolt 120. The spring is connected to a three-way valve 122 (not shown in FIGS. 1–3 for the sake of simplicity) which by means of suitable connections (not shown) connects the air spring to a source of high pressure air as well as to the atmosphere. A shock absorber 124 is pivotally connected at its lower end to the base frame by a bracket 126 and its plunger is pivotally connected to bracket 128 which is fixed to the web 38 of the seat support frame.

The seat support structure is provided with a ride position adjustment mechanism by means of which the air pressure within the air spring can be adjusted to compensate for the weight of the occupant in such a manner that the statically occupied seat will always be positioned at a midpoint between the permissible amplitude limits of the oscillatory motion of the seat. This is attained by an adjustment mechanism as disclosed in principle in our copending patent application now Patent 3,325,136 and assigned to the assignee of the present application.

This adjustment mechanism is comprised of the three-way valve 120 which has an actuating member 132 by means of which the air pressure within the spring 24 may be varied. When the actuating member is rotated in the counterclockwise direction (FIG. 7) the valve connects the air spring to the supply of high pressure air and when the actuating member is rotated in the clockwise direction the air spring is connected to the atmosphere. The stroke or the maximum amplitude of the seat's oscillation is controlled by a slot and pin connection between the seat support and base frame. A steel plate 134 is fixed to the front wall of the base frame and is provided with an upwardly extending slot 136. A pin 138 is slidably engaged in this slot and is connected by means of link 140 to the seat support frame. The link 140 is pinned thereto by means for pin 142 which extends through brackets 144. The slot 136 is provided with an appropriate nylon or similar antifriction liner 145 to provide proper wear resistance as well as to diminish any noises which might occur due to the sliding motion. An adjustment rod 148 is slidably carried in one flange 40 of the seat support. It is biased outwardly from the flange 40 by a spring 150, which is connected to bracket 90, and to an index finger 152 pivotally secured at the inner end of the rod. The index finger is pivotally connected to the bracket 154 mounted on the link 140. When the rod 148 is pushed inwardly the index finger will rotate counterclockwise (FIG. 7) and engage the actuating member 132 of the ride position adjustment. In the event that the static occupant load should depress the seat below its normal midride position the index finger will engage actuating member 132 rotated in the counterclockwise direction, thereby connecting the air spring 24 to a source of high pressure. By virtue of this the seat will rise until the arcuate portion 156 of the index finger will reach the depression 158 of the actuating member. At such time the valve will be in the neutral position and thereby close the air spring. In the alternative, if the static occupant load is lighter than average the index finger will rotate the actuating member 132 in the clockwise direction until sufficiently enough air has been released from the air spring to engage the curved and depressed portion.

Although but a single embodiment of the present invention has been illustrated and described, it will be apparent to those skilled in the art that various changes and modifications may be made therein without departing from the spirit of the invention or from the scope of the appended claims.

We claim:
1. A seat comprising:
a seat part;
a base part;
spring means supporting said seat part on said base part for biased travel in respect thereto; and
means connected to said seat and base parts to limit the travel of said seat part toward and away from said base part to a predetermined path in which said entire seat part moves in respect to said base part, yet the front portion of said seat part moves at a predetermined smaller velocity than the back portion thereof to thereby cause said seat part during said travel to be in a line with a line which would generally pivot around a point ahead of the front edge of said seat part and generally in the area of the knee point of the occupant of the seat.

2. A seat comprising:
a seat part having a seat member and a back member;
a base part;
resilient suspension means supporting said seat part on said part for biased travel in respect thereto in a predetermined path in which said entire seat part moves in respect to said base part, yet the front portion of said seat part moves at a predetermined smaller velocity than the back portion thereof;
means pivotally connecting said back member to said seat member; and
means connected to said back member and responsive to said travel of said seat part to pivot said back member in respect to said seat member to maintain substantially constant inclination of said back member in respect to said base part regardless of the position of said seat part in respect to the base part.

3. A seat according to claim 2 wherein said resilient suspension means are so connected between said seat and base parts as to cause said seat part during said movement in respect to said base part to be in line with a line which would generally pivot around a point ahead of the front edge of said seat part and generally in the area of the knee point of the occupant of the seat.

4. A seat according to claim 2 in which said pivotal connecting means connects said back member to said seat member at a point between the back edge of said seat member and the fore and aft center line of said seat member to thereby permit said back member to pivot generally about the hip point of the occupant of the seat.

5. A seat according to claim 2 wherein said resilient suspension means is comprised of spring means which provides a biased seat movement and separate linkage which limits the travel of said seat part in respect to said base part to a predetermined path.

6. A seat according to claim 5 wherein said linkage is an unsymmetrical scissors type linkage which is inclined at an upwardly slope from back of the seat towards the front of the seat to thereby cause said seat part, during said movement in respect to said base part, to be in line with a line which would generally pivot around a point ahead of said front portion of said seat part and generally in the area of the knee point of the occupant of the seat.

7. A seat comprising:
a seat part having a seat member;
a back member;
a base part;
resilient suspension means supporting said seat part on said base part for biased travel in respect thereto in a path in which one portion of said seat part moves at a smaller velocity than another portion of said seat part;
means pivotally connecting said back member to said seat member at a point between the back edge of said seat member and the fore and aft center line of said seat member, and means being responsive to said travel of said seat part to cause said back member in respect to said base part at a predetermined angle as well as to cause said back member to pivot in respect to said seat member generally at the hip point of the occupant.

8. A seat comprising:
a seat part;
a base part;
spring means supporting said seat part on said base part for oscillatory motion in respect to said base part;
link means connecting said seat part and base part to control the oscillatory motion between said parts in a manner to cause the front portion of said seat part to travel at a smaller velocity toward and away from said base part than the back portion of said seat part to thereby cause said seat part to pivot in respect to its front edge during said oscillatory motion, said link means comprising two fore and aft extending link members arranged in criss-cross relationship to each other and being connected to said base and seat parts by pivotal connecting means; the point of crossover between said link members being closer to the ends of said link member at the front of the seat than those at the back of the seat, and said link members being pivotally connected to each other at said point of crossover; said link members being connected to said base and seat parts in such a manner that a straight line drawn through the points of connection to said base part would intersect a straight line drawn through the points of connection to said seat part at a location generally at seat height and ahead of the front edge of said seat part.

9. A seat according to claim 8 wherein each of said link members has two fore and aft extending arms which are rigidly connected to each other to provide transverse stability to said seat part and each of which is pivotally connected at one of its ends to one of said parts and slidably connected at the other of its ends to the other of said parts.

10. A vehicle seat according to claim 8 wherein the fore and aft dimensions of said seat part is such that the knees of the seat's occupant would be located a substantial distance ahead of the front edge of said seat part.

11. A seat according to claim 8 wherein said seat part is comprised of a back and a seat supporting component, said back supporting component being pivotally mounted to said seat supporting component, and a linkage connecting said back supporting component to said link means to maintain the inclination of said back supporting component substantially constant in respect to said base part during oscillation of said seat part.

12. A vehicle seat according to claim 11 wherein said linkage is comprised of lever means fixed to said back supporting component and pivotally connected by a connecting link means to one of said link members.

13. A seat comprising:
a seat part;
a base part;
adjustable spring means supporting said seat part on said base part for biased travel in respect thereto;
means connecting said seat and base parts to limit the travel of said seat part toward and away from said base part to a predetermined path which is independent of the adjustment of said spring means and in which the entire seat part moves in respect to said base part, yet the back portion of said seat part moves at a smaller velocity than the back portion thereof;
said seat part comprising a seat supporting component and a back supporting component, said back supporting component being pivotally connected to said seat supporting component and being connected to said means connecting said seat and base parts by lever means which pivots said back supporting component in respect to said seat supporting component during said travel of said seat part to thereby maintain a generally constant inclination of said back supporting component in respect to said base part.

References Cited

UNITED STATES PATENTS

| | | | |
|---|---|---|---|
| 3,059,890 | 10/1962 | Radke et al. | 248—399 |
| 3,109,621 | 11/1963 | Simons et al. | 248—399 |
| 3,140,851 | 7/1964 | Bilancia | 248—399 |
| 3,144,270 | 8/1964 | Bilancia | 297—180 |
| 3,198,473 | 8/1965 | Holz | 248—399 |
| 3,178,148 | 4/1965 | Manke | 248—399 |
| 3,218,019 | 11/1965 | Elfes et al. | 248—399 |
| 3,233,859 | 2/1966 | Beoletto | 248—399 |
| 3,275,277 | 9/1966 | Illar et al. | 248—399 |

FOREIGN PATENTS

| | | |
|---|---|---|
| 831,304 | 5/1938 | France. |
| 106,079 | 7/1917 | Great Britain. |

CASMIR A. NUNBERG, *Primary Examiner.*

G. O. FINCH, *Assistant Examiner.*

UNITED STATES PATENT OFFICE

CERTIFICATE OF CORRECTION

Patent No. 3,356,413            December 5, 1967

Arthur O. Radke et al.

It is certified that error appears in the above identified patent and that said Letters Patent are hereby corrected as shown below:

Column 6, line 22, after "said" insert -- base --.

Signed and sealed this 3rd day of March 1970.

(SEAL)
Attest:

Edward M. Fletcher, Jr.            WILLIAM E. SCHUYLER, JR.
Attesting Officer            Commissioner of Patents